United States Patent [19]

Gaspar

[11] 4,171,258

[45] Oct. 16, 1979

[54] CATALYST AND PROCESS FOR HYDROCONVERSION OF HYDROCARBONS USING STEAM

[75] Inventor: Nöel J. Gaspar, Sarnia, Canada

[73] Assignee: Exxon Research & Engineering Co., Florham Park, N.J.

[21] Appl. No.: 828,078

[22] Filed: Aug. 26, 1977

Related U.S. Application Data

[63] Continuation-in-part of Ser. No. 637,274, Dec. 3, 1975, abandoned.

[51] Int. Cl.$^2$ .................... C10G 23/12; C10G 35/06
[52] U.S. Cl. ................................. 208/144; 208/136; 208/243
[58] Field of Search ............... 208/216, 215, 134, 135, 208/136, 243, 144; 252/373

[56] References Cited

U.S. PATENT DOCUMENTS

| | | | |
|---|---|---|---|
| 2,891,003 | 6/1959 | Chervenak et al. | 208/216 |
| 2,926,132 | 2/1960 | Weikart et al. | 208/216 |
| 3,112,257 | 11/1963 | Douwes et al. | 208/216 |
| 3,116,234 | 12/1963 | Douwes et al. | 208/216 |
| 3,477,963 | 11/1969 | van Venrooy | 208/215 |
| 3,530,194 | 9/1970 | Quik et al. | 208/134 |

*Primary Examiner*—George Crasanakis
*Attorney, Agent, or Firm*—Edward M. Corcoran

[57] ABSTRACT

A process for the steam hydroconversion of light hydrocarbon feed stocks relatively deficient in hydrogen and high in sulfur, which process comprises passing the feed and steam into a steam hydroconversion zone over a dual-function catalyst comprising molybdenum on a high surface area alumina base or on an iron oxide-chromium oxide base, said catalyst having been reduced and sulfided prior to use. A portion of the hydrocarbon is steam reformed to produce hydrogen in the reaction zone which is then used in situ to hydrogenate the olefins and aromatics in the feed and also removes sulfur therefrom, all processes occurring in the same reaction zone.

27 Claims, No Drawings

CATALYST AND PROCESS FOR HYDROCONVERSION OF HYDROCARBONS USING STEAM

CROSS-REFERENCE TO RELATED APPLICATIONS

This application is a continuation-in-part of copending application Ser. No. 637,274, filed Dec. 3, 1975 and now abandoned.

BACKGROUND OF THE INVENTION

1. Field of the Invention

This invention relates to a combination steam reforming-hydroconversion process for light hydrocarbon feeds wherein the hydrocarbon and steam are passed over a sulfur-resistant catalyst which performs the dual function of steam reforming and hydroconversion of the feed. More particularly, this invention relates to a process for steam reforming and hydroconverting a relatively light hydrocarbon that is relatively low in hydrogen and high in sulfur, which comprises passing steam and the hydrocarbon over a sulfur-resistant catalyst comprising molybdenum on a base selected from the group consisting of (a) a high surface area alumina base or (b) an iron oxide-chromium oxide base, said catalyst having been reduced and sulfided prior to use, whereby the steam reforming and hydroconversion are achieved in the same reaction zone.

2. Description of the Prior Art

Steam reforming is well known to those familiar in the art as a process for producing hydrogen or hydrogen-containing gas mixtures by converting hydrocarbons with steam. The hydrocarbon reacts with steam to form carbon monoxide and hydrogen in a gasification reaction. The carbon monoxide is then reduced to a low level by a water gas shift reaction, which also produces more hydrogen. The two reactions combine in steam reforming as illustrated by the following equations.

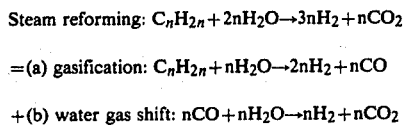

Steam reforming: $C_nH_{2n} + 2nH_2O \rightarrow 3nH_2 + nCO_2$ $=$ (a) gasification: $C_nH_{2n} + nH_2O \rightarrow 2nH_2 + nCO$ $+$ (b) water gas shift: $nCO + nH_2O \rightarrow nH_2 + nCO_2$ One of the more commonly used catalysts for steam reforming is nickel oxide. Nickel oxide catalysts are very reactive and steam resistant. Unfortunately, however, these catalysts are not resistant to sulfur and, consequently, their catalytic activity rapidly diminishes to an unacceptably low level in the presence of sulfur-containing hydrocarbons. Platinum and other noble metal containing catalysts are also quite active for steam reforming hydrocarbon fractions, but these too are rapidly poisoned by relatively small quantities of sulfur in the feed. Catalysts commonly used for the water gas shift reaction include iron/chromium oxide and zinc/copper oxide catalysts, while the more efficient hydrogenation catalysts contain one or more noble metals. These catalysts are also poisoned and deactivated by sulfur. Unfortunately, many of the well known sulfur tolerant hydrogenation catalysts are deactivated in the presence of steam and are therefore totally unsuitable in the steam reforming process.

The petroleum industry is increasingly turning to coal, tar sands and heavy crudes as sources for future raw materials. Feed stocks derived from these heavier materials are quite naturally heavier but they are also more hydrogen deficient and higher in sulfur and nitrogen than feed stocks derived from more conventional crude oils. These heavier feed stocks therefore require a considerable amount of upgrading to usable products, such upgrading being accomplished by various hydroconversion reactions such as hydrodesulfurizing and hydrogenating, both of which require large volumes of hydrogen and consequently result in very high processing costs. One way of processing such feeds is to pass the sulfur-containing feed to a first zone wherein sulfur is removed via contact with a hydrodesulfurization catalyst, followed by a steam reforming zone wherein the desulfurized feed is contacted with steam and a catalyst to convert a minor portion of the feed to hydrogen, followed by passing the feed and hydrogen from the steam reforming zone to a third zone wherein the unsaturated portions of the feed are saturated by catalytic hydrogenation. Further, steam reforming is endothermic in nature requiring heat input to the reaction zone, while hydrogenation is exothermic.

It is apparent therefore, that it would be a significant improvement to the art if one could develop a process and steam and sulfur-resistant dual-function catalysts which would permit combining the endothermic hydrocarbon-steam reforming reaction to produce hydrogen and, at the same time, allow in situ utilization of the hydrogen produced by the steam reforming to saturate the olefins present in the feed and hydrodesulfurize same, all in the same reaction zone. This would eliminate the need for a separate source of hydrogen, eliminate the need for the plurality of reaction zones heretofore required for such processing and also result in substantial energy savings, because the exothermic hydroconversion reactions would provide at least a portion of the heat required for the endothermic steam reforming.

SUMMARY OF THE INVENTION

It has now been discovered that one can achieve a process combining hydrocarbon steam reforming and hydroconversion processes for sulfur and olefin containing, light hydrocarbon feed streams wherein the processes all occur in the same reaction zone, which comprises passing steam and the hydrocarbon feed into a steam hydroconversion zone over a dual-function catalyst comprising molybdenum on a base selected from the group consisting of (a) a high surface area alumina base and (b) an iron oxide-chromium oxide base, said catalyst having been reduced and sulfided prior to use. Essential to the understanding and practice of this invention is the fact that no external hydrogen needs to be added to the steam hydroconversion zone. Hydrogen is produced in the steam hydroconversion zone via an endothermic hydrocarbon-steam reforming reaction and this hydrogen so produced is used in situ to saturate olefins present in the feed and hydrodesulfurize same. For the sake of brevity, the combination of steam reforming and hydroconversion processes, both of which occur in the same reaction zone (steam hydroconversion zone) will hereinafter be referred to as steam hydroconversion. It has also been discovered that the addition of minor amounts of alkali or alkaline earth metals to the catalyst will greatly improve its life.

By steam reforming is meant the combination gasification plus water gas shift described supra, wherein olefins in the hydrocarbon stream react with steam to produce carbon dioxide and hydrogen. Hydroconversion processes refer to hydrodesulfurization of the feed and hydrogenation of the unsaturated olefins present therein, along with some mild hydrocracking and attendant hydrogenation of the hydrocrackate and wherein the hydrogen consumed is that produced by the steam reforming reaction. The following equations illustrate the steam hydroconversion (steam reforming plus hydroconversion) of propylene to form propane, wherein the maximum theoretically obtainable yield at 100% conversion is 90 mole % of propane.

(a) steam reforming $$C_3H_6 + 0.6H_2O \rightarrow 0.9C_3H_6 + 0.3CO_2 + 0.9H_2$$

(b) hydrogenation $$0.9C_3H_6 + 0.9H_2 \rightarrow 0.9C_3H_8$$

(c) overall $$C_3H_6 + 0.6H_2O \rightarrow 0.9C_3H_8 + 0.3CO_2$$

Catalysts useful in the process of the instant invention comprise dual-function steam hydroconversion catalysts that are resistant to both steam and sulfur, said catalysts comprising molybdenum alone or in admixture with cobalt as the active catalytic metals on either a high surface area alumina base or on an iron oxide-chromium oxide base, said catalyst having been reduced and sulfided prior to use. Additionally, it has been found that the effective life of the catalyst is greatly increased if the catalyst is promoted with small amounts of one or more alkali and/or alkaline earth metals.

Although it is preferred that the catalytic metals initially be present on the catalysts as sulfides, said metals may also initially be present on the catalyst as oxides, reduced forms of the metal or as mixtures of these and other forms. What is important to the operation of the instant invention is that the catalytically active metals be converted to the sulfide form either in the manufacture of the catalyst, by pretreating same prior to its use in the operation of the instant invention or by in situ conversion of the oxide or reduced forms to the sulfides via sulfur-containing feeds.

These metals will be present in the catalysts in catalytically active amounts, e.g., from about 5 to about 50 wt. % (calculated as metal), preferably from about 10 to 40 wt. % and most preferably from about 15 to 30 wt. % based on the total weight of the catalyst when the active metal is molybdenum. Particularly preferred catalysts include (a) about 25 to 50 wt. % molybdenum sulfide and (b) 15 to 30 wt. % molybdenum sulfide along with 2 to 10 wt. % cobalt sulfide based on the total weight (dry basis) of the catalyst composition.

The exact method used to sulfide the catalyst is not important and the art recognizes several ways in which one may sulfide such catalysts. Illustrative examples include (a) using hydrogen sulfide with hydrogen, (b) using carbon disulfide with hydrogen or in a hydrocarbon feed in the presence of hydrogen and (c) using a sulfur-containing feed in a reducing atmosphere.

In addition to the catalytically active metal components, the catalyst may also contain minor amounts of other Group VIB and VIII metals such as tungsten, platinum, rhenium, and nickel which, while not necessarily catalytically active in the instant invention, have been found not to exert a deleterious effect to the operation of same. As much as 5 wt. % of these other metals may be present on the catalyst without incurring any deleterious effect.

The ratio of molybdenum to cobalt in catalysts containing both of these metals generally ranges from 1.5/1 to 20/1, preferably 3.5/1 to 10/1 and most preferably from 4.5/1 to 8.5/1. If minor amounts of other group VIB or VIII metals are present, the ratio of molybdenum to these other metals will generally range from about 50/1 to 5/1 and preferably from 25/1 to 10/1.

The alumina support material employed in the catalysts of this invention is most preferably a high surface area type of alumina having a surface area of from about 100 to about 400 m²/g (square meters per gram) and most preferably from about 150 to about 350 m²/g. A particularly preferred alumina support is eta alumina having a surface area of approximately 300 m²/g. Although the presence of silica in the alumina support is detrimental to the process of the instant invention, the support may contain up to about 5 wt. % silica (based on the total weight of the support) without incurring any serious adverse effects to the processes of the instant invention. As hereinbefore stated, supra, the catalyst life is greatly improved by the addition of minor amounts of alkali and/or alkaline earth metals illustrated by, but not limited to, metals such as barium and cesium. In general, these metals will range from about 1 to 10 wt. % (based on total catalyst weight), and preferably from about 2.5 to about 10%. The alkali and/or alkaline earth metals are generally incorporated into the catalyst base in the form of acetates or carbonates.

A particularly preferred catalyst useful in the process of the instant invention comprises from about 25 to about 50 wt. % molybdenum sulfide and from about 2 to 8 wt. % cesium carbonate based on the total weight (dry basis) of the catalyst, supported on an eta alumina base.

The iron oxide-chromium oxide base or support will contain from about 1 to 15 wt. % chromium oxide (calculated as $Cr_2O_3$) with most of the balance being iron oxide (calculated as $Fe_2O_3$). These supports are of the type in U.S. Pat. No. 2,662,063, the disclosures of which are incorporated herein by reference. The surface area of this type of support generally ranges around 100 m²/g. A preferred catalyst useful in this invention will comprise from about 20 to 30 wt. % molybdenum (based on total catalyst weight, dry basis) on the iron oxide-chromium oxide support.

The steam hydroconversion catalysts of the instant invention may be prepared by any conventional manner known in the art. For example, a commercial alumina catalyst base of the desired surface area may be soaked in a solution of ammonium molybdate containing the desired amount of molybdenum. The water is removed in a flash evaporator and the resulting catalyst is dried at 230° F. and calcined in air at about 930° F. Prior to use in the laboratory, it has been found convenient to reduce and sulfide the molybdenum by passing a mixture of 10% $H_2S$ in hydrogen over the catalyst at about 930° F. Up to 50% inert gas may be added in this last step to prevent overheating due to the exothermic nature of the reaction.

The iron oxide-chromium oxide support may be prepared by coprecipitating a mixture of chromous and ferrous hydroxides by the addition of sodium hydroxide solution to an aqueous solution of ferrous sulfate and chromic acid containing the desired amont of iron and chromium. The hydroxide precipitate is air dried at up to about 1100° F. during which time the hydroxides are oxidized to chromic and ferric oxides. The resulting material may be pelletized or extruded by standard methods. Molybdenum is then deposited on this base by the method described above for the alumina base and the resulting catalyst calcined, reduced and sulfided as previously described. During the sulfiding step the chromium and iron oxide may also be converted to their sulfides. Alternatively, the chromium oxide may be deposited on the iron oxide.

In accordance with the instant invention, the afore-described catalysts are employed to steam hydroconvert light, sulfur containing feed stocks by contacting said feed stocks with the catalyst in the presence of steam at a temperature in the range of from about 500° to 1200° F. and preferably 750° to 1000° F.; a pressure in the range of from about 0 to 1000 psig and preferably 0 to 600 psig; a steam to hydrocarbon mole ratio of from about 0.5 to 10 and preferably 1.5 to 6.5, with a gaseous hourly space velocity (V/V/Hr.) in the range of from about 20 to 200 and preferably from about 40 to 150 V/V/Hr.

Hydrocarbon feeds useful in the process of the instant invention are the relatively lighter petroleum fractions containing unsaturated olefins, ranging from those hydrocarbons normally gaseous at room temperature and pressure, such as propylene, through light, steam cracked naphthas having a boiling range of from about 140° to 200° F. up to and including feeds such as coker naphthas boiling in the range of from about 140° to 400° F. In general, these feeds may have sulfur contents up to about 0.5 wt. % and may have levels of unsaturation such that the Bromine Number ranges from about 50 to 200. However, both the sulfur content and unsaturation may be appreciably higher as evidenced by the fact that the catalysts of the instant invention were effective in steam hydroconverting propylene to propane in the presence of 4 wt. % $H_2S$. Propylene has a theoretical Bromine Number of 380. Further, feeds derived from the heavier materials such as heavy crudes, tar sands, shale oil, coal, etc. will contain considerably more unsaturated olefins and sulfur than those derived from more conventional crude oils. Although feed stocks relatively low in sulfur or containing no sulfur at all may be steam hydroconverted with the catalysts of this invention, one of the outstanding features of same is the ability to steam hydroconvert feeds containing over about 50 ppm of sulfur by using a single, dual-function catalyst with both the steam reforming and hydroconversion processes taking place simultaneously in the same reaction zone without having to add any external hydrogen to the reaction zone.

DESCRIPTION OF THE PREFERRED EMBODIMENT

The following examples further illustrate the present invention. Unless otherwise specified, all percentages and parts are by weight.

EXAMPLE 1

Steam hydroconversion catalysts in accordance with the invention were prepared as follows:

A number of commercially available catalysts (listed in Table 1) were impregnated with various amounts of metals, including rhodium, molybdenum and rhenium as shown in the Table, by soaking same in aqueous solutions of the desired metal, followed by flash evaporation of the water and air calcining for one hour at 900° F. Some of the catalysts were not modified, while the rhenium or alumina catalyst used for run 21 was prepared by soaking a commercial alumina in a solution of rhenium trichloride followed by flash evaporation of the water and air calcining for one hour at 900° F. All of the catalysts were reduced and sulfided by contact with a 10/1 mixture of $H_2/H_2S$ for one hour, or until $H_2S$ breakthrough, at a temperature of 900° F. and atmospheric pressure in order to convert the catalytic metals thereon to the sulfide form. During sulfiding it was occasionally necessary to dilute the $H_2/H_2S$ mixture with an inert gas in order to maintain the temperature at 900° F., due to the exothermic nature of the reaction.

The sulfided catalysts were then contacted with steam and a propylene stream containing 4% $H_2S$ in the ratio of 4/1 steam/propylene, at a temperature in the range of 750° to 950° F., at atmospheric pressure and a space velocity of 120 V/V/Hr. The $H_2S$ was added to the feed in order to determine the resistance of the various catalysts to sulfur and amounted to 40,000 ppm of sulfur in the hydrocarbon feed stream.

Table 2 contains the results of the experiment which are expressed as the percent of propane in the off or product gas. The noble metal and rhenium catalysts, both of which are useful for steam reforming, were relatively ineffective, while the molybdenum containing catalysts operated effectively in the sulfur containing stream and steam hydroconverted some of the propylene to propane.

TABLE 1

CATALYST COMPOSITIONS FOR STEAM HYDROCONVERTING PROPYLENE

| Run No. | Catalysts and Compositions[a] | | |
|---|---|---|---|
| 1 | Cyanamide CK-303 with 0.3% Rh. | (0.3% Pt. on $Al_2O_3$) | Impregnated |
| 2 | Nalco 471A | (3.5% CoO and 12.5% $MoO_3$ on $Al_2O_3$). | |
| 3 | Girdler T-828 | (2.5% NiO, 3% CoO and 10% $MoO_3$ on $Al_2O_3$). | |
| 11 | Girdler G-3A with 10% Mo. | (10% $Cr_2O_3$ on $Fe_2O_3$) | Impregnated |
| 12 | Girdler G-3A with 25% Mo. | (10% $Cr_2O_3$ on $Fe_2O_3$) | Impregnated |
| 13 | Girdler G-3A with 5% Mo | (10% $Cr_2O_3$ on $Fe_2O_3$) | Impregnated |
| 19 | Harshaw Mo-1201 | (10% $MoO_3$ on $Al_2O_3$). | |
| 21 | 2% Re on $Al_2O_3$. | | |

TABLE 1-continued

CATALYST COMPOSITIONS FOR STEAM HYDROCONVERTING PROPYLENE

| Run No. | Catalysts and Compositions[a] |
| --- | --- |
| 28 | 3.5% CoO and 14% $MoO_3$ on $Al_2O_3$. |

Notes:
[a]Metal content as oxide based on total catalyst composition.

TABLE 2

EFFECTIVENESS OF CATALYSTS IN STEAM HYDROCONVERTING PROPYLENE[b] TO PROPANE

All catalysts reduced and sulfided in 10/1 $H_2/H_2S$ prior to use.

| Run No.[a] | % $C_3H_8$ in Product Gas |
| --- | --- |
| 1 | 1.1 |
| 2 | 7.6 |
| 3 | 7.6 |
| 11 | 7.8 |
| 12 | 8.3 |
| 13 | 7.5 |
| 19 | 7.8 |
| 21 | 2.2 |
| 28 | 13.7 |

Notes:
[a]Catalyst compositions correspond to those in Table 1.
[b]4 wt. % $H_2S$ in propylene feed.

EXAMPLE 2

In this experiment, as in Example 1, supra, a number of commercially available catalyst supports or bases were impregnated with 25% molybdenum which was then reduced, sulfided and contacted with the same feed stream and at the same conditions as in Example 1. The results are shown in Table 3 and suggest that more effective steam hydroconversion of propylene to propane is obtained if one employs both higher surface area supports and supports that are primarily alumina. The most effective catalyst in this experiment was 25% molybdenum on eta alumina.

TABLE 3

EFFECT OF SURFACE AREA OF CATALYST SUPPORT

25% molybdenum reduced and sulfided on support

| Support | Surface Area $m^2/g$ | % Propane in Product Gas |
| --- | --- | --- |
| Davison 970 (87/13 $SiO_2/Al_2O_3$) | 100 | 3.5 |
| Harshaw Al-3428 ($Al_2O_3$) | 176 | 19.3 |
| Davison ($\rho$-$Al_2O_3$) | 300 | 24.7 |

EXAMPLE 3

In this experiment, samples of the 25% molybdenum on eta alumina catalyst were impregnated with alkali and alkaline earth metals by soaking the molybdenum on alumina catalyst in an aqueous solution of the acetate, carbonate or hydroxide of the alkali or alkaline earth metal which contained the desired amount of metal, removing the water by flash evaporation and drying and calcining the impregnated catalysts at temperatures up to 500° C. (930° F.) for one hour in air.

TABLE 4

IMPROVEMENT OF CATALYST LIFE BY ADDITION OF ALKALI AND ALKALINE EARTH METALS

| Added Metal | % of Activity Loss |
| --- | --- |
| None | 37 |
| 5% Ba | 28 |
| 5% Cs | 13 |
| 2.5% Cs | 20 |

The impregnated catalysts were reduced and sulfided using the method outlined in Example 1. The sulfided catalysts were then contacted with a 3/1 steam/propylene feed stream at about 750° F., atmospheric pressure and a space velocity of about 60 V/V/Hr. The effect of the alkali and alkaline earth metals was determined by measuring the loss of catalytic activity for steam hydroconverting the propylene to propane after between ¾ and 2½ hours onstream.

The results in Table 4 show that both alkali and alkaline earth metals are effective in improving the catalyst life.

EXAMPLE 4

This illustrates the effectiveness of the invention in steam hydroconverting a sour, steam cracked naphtha. A 10% molybdenum on eta alumina catalyst sold commercially by the Harshaw Chemical Company as Mo-1201 for hydrogenation, dehydrogenation and hydroforming was utilized. This catalyst could be prepared by soaking alumina of desired surface in ammonium molybdate solution followed by flash evaporation of the water and drying and calcining in air.

The catalyst was reduced and sulfided prior to use according to the procedure outlined in Example 1. It was then contacted with a sulfur-containing, sour, steam cracked naphtha feed at a temperature of 950° F., a pressure of 600 psig, normalized space velocity of 140 V/V/Hr. and a steam/feed mole ratio of 4/1. The results given in Table 5 show a substantial decrease in both sulfur content and Bromine Number.

TABLE 5

STEAM HYDROCONVERTING SOUR STEAM CRACKED NAPHTHA

| | Feed | Product |
| --- | --- | --- |
| Sulfur, ppm | 500 | 250 |
| Bromine Number | 90 | 20 |

EXAMPLE 5

This illustrates the effect of different space velocities and steam mole ratios on the steam hydroconversion of propylene to propane.

A 25% molybdenum on eta alumina catalyst was prepared by the method of Example 3. Propylene and steam in varying mole ratios were passed over the catalyst at atmospheric pressure and 750° F. The propylene feed contained 4% $H_2S$. Table 6 below shows that highest yields of propane were obtained at a gaseous hourly space velocity of 120 when the mole ratio of steam to propylene was 1.5. Similarly high yields were obtained at a low space velocity of 40 V/V/Hr when 6.5 moles of steam were added. The catalyst was regenerated with air and resulfided between each different condition.

TABLE 6

| $C_3^=$ Space Velocity V/V/Hr | $H_2O/C_3^=$ Mole Ratio | % Propane in Product |
|---|---|---|
| 120 | 8 | 10.7 |
| " | 4 | 24.7 |
| " | 2 | 26.7 |
| " | 1.5 | 36.9 |
| " | 0.8 | 30.2 |
| 40 | 6.5 | 39.9 |

EXAMPLE 6

This illustrates the effect of pressure on the steam hydroconversion of propylene to propane.

A 25% molybdenum on eta alumina catalyst was prepared as previously described. Propylene containing 4% sulfur as hydrogen sulfide or butylmercaptan was passed over the catalyst at 750° F. at atmospheric pressure and at 300 psig. Table 7 shows the conversion of propylene, selectivity of the reaction to propane and propane yields when operating at 40 V/V/Hr at atmospheric pressure and 120 V/V/Hr at 300 psig.

TABLE 7

| Press psig | $C_3^=$ Sp Vel V/V/Hr | $H_2O/C_3^=$ Mole Ratio | Propylene Conversion, % | Propane Selectivity, % | Propane Yield, % |
|---|---|---|---|---|---|
| 0 | 40 | 6.5 | 65.5 | 65.2 | 42.8 |
| 300 | 120 | 6.5 | 98.0 | 78.5 | 77.0 |

What is claimed is:

1. A process for the steam hydroconversion of a light hydrocarbon feed stock boiling below about 400° F. and containing olefins and sulfur compounds to desulfurize said feedstock and hydrogenate said olefins in the absence of added hydrogen, said process comprising passing said feedstock and steam into a steam hydroconversion zone over a dual function catalyst comprising molybdenum on a base selected from the group consisting of (a) a high surface area alumina and (b) a mixture of iron oxide and chromium oxide, said catalyst being sulfided prior to use.

2. The process of claim 1 wherein the catalyst contains a minor amount of one or more metals selected from the group consisting of alkali metal, alkaline earth metal and mixtures thereof.

3. The process of claim 2 wherein the amount of catalytically active metal ranges from about 5 to 50 wt. % based on the total weight of the catalyst.

4. The process of claim 3 wherein said minor amount of alkali metal, alkaline earth metal and mixtures thereof ranges from 1 to 10 wt. % based on the total weight of the catalyst.

5. The process of claim 4 wherein the catalyst contains from 25 to 50 wt. % molybdenum sulfide.

6. The process of claim 5 wherein the catalyst contains from 15 to 30 wt. % molybdenum sulfide and from 2 to 10 wt. % cobalt sulfide based on the total weight of the catalyst composition.

7. The process of claim 5 wherein said alkali metal, alkaline earth metal and mixtures thereof is selected from the group consisting of cesium and barium.

8. The process of claim 7 wherein the surface area of the alumina base ranges from 100 to 400 m²/g.

9. The process of claim 8 wherein the base is η-alumina having a surface area of about 300 m²/g.

10. The process of claim 3 wherein said feed contains at least about 50 ppm of sulfur.

11. The process of claim 10 wherein the olefin content of said feed is such that the bromine number thereof is at least about 50.

12. The process of claim 11 wherein said feed boils within the range of from about 140° F. to about 400° F.

13. The process of claim 4 wherein the catalyst comprises from about 20 to 30 wt. % molybdenum on an iron oxide-chromium oxide base containing from 1 to 15 wt. % chromic oxide.

14. A steam hydroconversion process for desulfurizing and saturating olefins in a light hydrocarbon feed wherein said feed boils below about 400° F., and contains sulfur and olefins wherein the olefin content of said feed provides for a bromine number of at least about 50, which comprises passing steam and said hydrocarbon feed, in the absence of hydrogen, into a steam hydroconversion zone over a dual-function catalyst comprising molybdenum on a base selected from the group consisting of (a) a high surface area alumina base and (b) an iron oxide-chromium oxide base and wherein said catalyst is sulfided prior to use.

15. The process of claim 14 wherein said catalyst contains from about 1 to 10 wt. % of metal selected from the group consisting of alkali metal, alkaline earth metal and mixtures thereof.

16. The process of claim 15 wherein the feed boils within the range of from about 140° F. to about 400° F.

17. The process of claim 16 wherein the feed contains at least 50 ppm of sulfur.

18. The process of claim 17 wherein the amount of molybdenum sulfide on said sulfided catalyst ranges from 25 to 50 wt. % based on the total weight of the catalyst composition.

19. The process of claim 18 wherein said sulfided catalyst consists essentially of from 25 to 50 wt. % molybdenum sulfide and 2 to 8 wt. % cesium on an η-alumina base.

20. The process of claim 17 wherein the catalyst consists essentially of 15 to 30 wt.% molybdenum sulfide, 2 to 10 wt.% cobalt sulfide and 2 to 8 wt.% cesium on an alumina base having a surface area of from 150 to 350 m²/g.

21. A steam hydroconversion process for desulfurizing and saturating olefins in a light hydrocarbon feed boiling below about 400° F. and containing at least 50 ppm of sulfur which comprises passing steam and said hydrocarbon feed into a steam hydroconversion zone, in the absence of added hydrogen, over a dual-function catalyst comprising 20 to 30 wt. % molybdenum on an iron oxide-chromium oxide base wherein the amount of chromium oxide in the base ranges from 1 to 15 wt. % calculated as $Cr_2O_3$, said catalyst also containing from about 1 to 10 wt. % of metal selected from the group consisting of alkali metal, alkaline earth metal and mixtures thereof and wherein said catalyst is sulfided prior to use.

22. The process of claim 11 wherein the feed consists essentially of a mixture of propylene and $H_2S$.

23. The process of claim 13 wherein said feed boils in the range of from about 140° F. to about 400° F.

24. The process of claim 18 wherein the feed consists essentially of a mixture of propylene and $H_2S$.

25. The process of claim 20 wherein the feed consists essentially of a mixture of propylene and $H_2S$.

26. The process of claim 21 wherein the feed consists essentially of a mixture of propylene and $H_2S$.

27. The process of claim 21 wherein said feed boils within the range of from about 140° F. to about 400° F.

* * * * *